(12) United States Patent
Bonaventure et al.

(10) Patent No.: US 10,965,790 B2
(45) Date of Patent: Mar. 30, 2021

(54) MOBILE COMMUNICATION DEVICE FOR PROVIDING NETWORK ACCESS FROM A FIRST NETWORK TO A SECOND NETWORK

(71) Applicant: TESSARES SA, Louvain-la-Neuve (BE)

(72) Inventors: Olivier Bonaventure, Gembloux (BE); Sébastien Barré, Martouzin-Neuville (BE); Gregory Detal, Thorembais-Saint-Trond (BE)

(73) Assignee: TESSARES SA, Louvain-la-Neuve (BE)

( * ) Notice: Subject to any disclaimer, the term of this patent is extended or adjusted under 35 U.S.C. 154(b) by 0 days.

(21) Appl. No.: 16/470,469

(22) PCT Filed: Dec. 1, 2017

(86) PCT No.: PCT/EP2017/081260
§ 371 (c)(1),
(2) Date: Jun. 17, 2019

(87) PCT Pub. No.: WO2018/108590
PCT Pub. Date: Jun. 21, 2018

(65) Prior Publication Data
US 2020/0092400 A1    Mar. 19, 2020

(30) Foreign Application Priority Data
Dec. 16, 2016   (EP) .................................... 16204583

(51) Int. Cl.
*H04L 29/06* (2006.01)
*H04L 1/00* (2006.01)
(Continued)

(52) U.S. Cl.
CPC .............. *H04L 69/22* (2013.01); *H04L 1/008* (2013.01); *H04L 61/2514* (2013.01); *H04L 69/16* (2013.01); *H04W 88/16* (2013.01)

(58) Field of Classification Search
CPC ....... H04L 1/008; H04L 45/22; H04L 47/193; H04L 61/2514; H04L 69/14; H04L 69/16;
(Continued)

(56) References Cited

U.S. PATENT DOCUMENTS

| | | | | |
|---|---|---|---|---|
| 10,327,274 | B2 * | 6/2019 | Subhan ................. | H04W 24/08 |
| 2007/0243872 | A1 * | 10/2007 | Gallagher ............. | H04W 76/12 |
| | | | | 455/436 |

(Continued)

OTHER PUBLICATIONS

Ford et al. "TCP Extensions for Multipath Operation with Multiple Addresses," Internet Engineering Task Force Trust, Issue No. 2070-1721, Jan. 2013, 52 pages.
(Continued)

*Primary Examiner* — Mewale A Ambaye
(74) *Attorney, Agent, or Firm* — Workman Nydegger

(57) ABSTRACT

A method provides for a first networking node in a first network access to a second network by a mobile communication device including the steps: by a first gateway in the first network, extracting payload data and header information from a first data packet originating from the first networking node and addressed to a second networking node in the second network, and sending the extracted payload and header information as payload of a second data packet to the mobile communication device; and, by the mobile communication device, receiving the second data packet, retrieving therefrom the extracted payload and header information, and sending the extracted payload and header information as payload of a third data packet to the second gateway; and, by the second gateway, receiving the third
(Continued)

data packet, retrieving therefrom the first data packet and forwarding the first data packet further to the second networking node.

12 Claims, 7 Drawing Sheets

(51) Int. Cl.
*H04L 29/12* (2006.01)
*H04W 88/16* (2009.01)

(58) Field of Classification Search
CPC ......... H04L 69/22; H04L 40/22; H04L 88/04; H04L 88/16
See application file for complete search history.

(56) References Cited

U.S. PATENT DOCUMENTS

| | | | | |
|---|---|---|---|---|
| 2009/0135729 A1* | 5/2009 | Saffre | ................... | H04L 47/724 370/252 |
| 2013/0170451 A1* | 7/2013 | Krause | ................... | H04L 69/14 370/329 |
| 2015/0201442 A1* | 7/2015 | Kim | ...................... | H04W 76/12 370/329 |
| 2016/0212778 A1* | 7/2016 | Grootwassink | ....... | H04W 28/12 |
| 2017/0279664 A1* | 9/2017 | Zhang | ................... | H04L 12/283 |
| 2018/0152921 A1* | 5/2018 | Jung | ........................ | H04L 5/14 |

OTHER PUBLICATIONS

Cheshire et al. "DNS-Based Service Discovery," Internet Engineering Task Force Trust, Issue No. 2070-1721, Feb. 2013, 40 pages.
Cheshire et al. "Multicast DNS," Internet Engineering Task Force Trust, Issue No. 2070-1721, Feb. 2013, 57 pages.
Peirens et al. "Link Bonding with Transparent Multipath TCP," MPTCP Working Group, Jul. 5, 2016, 22 pages.
Boucadair et al. "Network-Assisted MPTCP: Use Cases, Deployment Scenarios and Operational Considerations," Network Working Group, Dec. 7, 2016, 30 pages.
Extended European Search Report for EP Application No. 16204583.5, dated Apr. 13, 2017.
International Search Report for Application No. PCT/EP2017/081260, dated Mar. 5, 2018.

* cited by examiner

MOBILE COMMUNICATION DEVICE FOR PROVIDING NETWORK ACCESS FROM A FIRST NETWORK TO A SECOND NETWORK

FIELD OF THE INVENTION

The present invention generally relates to the field of mobile and wireless communication. More particular, the invention relates to the field of providing network access from a first network to a second network by a mobile communication device that is wirelessly connected to both the first and second network, further referred to by the term network bonding.

BACKGROUND OF THE INVENTION

Today, most smartphones can be configured as a mobile hotspot. When acting a hotspot, the smartphone shares its Internet connection with another device over a wireless link. The smartphone's Internet connection is typically established over a cellular network using for example UMTS, HSDPA, LTE etc. The wireless link with the other device is then established by a second wireless interface on the smartphone. This wireless link may for example be established by Bluetooth or Wireless LAN, also referred to as WLAN or Wi-Fi.

In one application, a smartphone configured as mobile hotspot can be used to connect a client device such as a laptop or tablet to the Internet. The client device then connects as a wireless client to the smartphone that is configured as a wireless access point.

In a second application, a smartphone configured as mobile hotspot can be used to connect an entire local network to the Internet. This application is particularly useful for local networks composed of end users that are connected to the Internet over a wired access network, for example by cable, optical fibre or twisted pairs. The mobile hotspot could then provide an extra Internet connection in order to speed-up the connection using multi-path techniques or to serve as backup connection in case of failure of the wired connection. As the local or home networks often contain a wireless access point, either separately or integrated in a router, this second Internet access can be provided without further hardware upgrades.

A problem with current mobile hotspot solutions is that the smartphone always needs to be configured as an access point. This way, the wireless interface can no longer be used for wireless access by the mobile device over the same interface. For example, in the second application, the smartphone could no longer be used to access the home network or to connect to the Internet via the wired access network.

A further problem is that in order to implement the mobile hotspot functionality the networking stack of the mobile device needs to be changed. Such functionality cannot be provided by a user application or an app that is typically distributed through an application store. Therefore, the mobile hotspot functionality can only be implemented by the smartphone vendor, by rooting the device or when administrative privileges are assigned to the application which is in general not the case for apps.

SUMMARY OF THE INVENTION

It is an object of the invention to overcome the above mentioned problems and, amongst others, to provide a hot spot user application for a mobile communication device that doesn't render one of the wireless interfaces unusable.

This object is achieved by a computer-implemented method for providing a first networking node in a first network access to a second network by a mobile communication device. The mobile communication device is further connected as a wireless client to both the first and the second network. The method comprises the following steps:

By a first gateway in the first network, extracting payload data and header information from a first data packet originating from the first networking node and addressed to a second networking node in the second network, and sending the extracted payload and header information as payload of a second data packet to the mobile communication device.

By the mobile communication device, receiving the second data packet, retrieving therefrom the extracted payload and header information, and sending the extracted payload and header information as payload of a third data packet to the second gateway.

By the second gateway, receiving the third data packet, retrieving therefrom the first data packet and forwarding the first data packet further to the second networking node.

The mobile communication device, further also referred to as mobile device, is thus the device that provides the actual network access to the first networking node. The mobile device may be any device that comprises two wireless network interfaces, one to connect to the first network and the other to connect to the second network, for example a smartphone, a tablet or laptop computer. As the mobile device is connected as a wireless client, it does not serve nor is it configured as an access point. Therefore, during the steps of the above method, the client can still establish or maintain other data connections with other networking nodes in both the first and second network.

Besides the mobile device, also the first and second gateways serve as proxy nodes in order to provide the first networking node access to the second network, i.e., to provide the bonding service. As the first gateway sends the second packet to the mobile device, the second packet has the mobile device as its destination. Similarly, as the mobile device sends the third packet to the second gateway, the third packet has the second gateway as its destination. Advantageously, these second and/or third data packets are connectionless transport protocol packets such as UDP packets. This way, a reliability or congestion control mechanism used by the transport protocol for the embedded first data packet does not interact with a mechanism that would be used by the transport protocol for the second data packet. For example, a connectionless transport protocol such as UDP would not interact with a connection-oriented transport protocol like TCP. In this disclosure, data units exchanged under the UDP or TCP transport protocols are referred to as TCP/UDP packets or segments.

Packets sent by the networking node to the second network are thus intercepted by the first gateway, sent inside the payload of a another packet to the mobile device, sent again as payload to the second gateway, and then forwarded by the second gateway to their destination in the second network.

The first network may correspond to a Local Area Network (LAN) such as a home network or enterprise network. The second network may correspond to a public network such as a cellular access network. In this regard, the first gateway acts as the gateway for the networking node to access network devices outside the first network. The first gateway may for example correspond to a router and further be embedded in a home gateway or Customer Premises Equipment (CPE). Such a home gateway or CPE may further embed modem functionality in order to provide further network access over fibre, DSL, cable and the like. The first gateway may further comprise a wireless interface for the wireless connection with the mobile device as is often the case with home gateway devices installed at user premises. Alternatively, the first network may comprise a separate wireless access point that is used by the gateway to connect with the mobile device. The second gateway may further correspond to a gateway in a cellular network connecting the mobile device to the second network. Traffic passing between the mobile device and the second network may then always be intercepted by the second gateway.

It is an advantage that by the above method, the mobile device can offer a bonding service for sharing its connection to the second network with other networking devices in the first network.

Because both the first and second gateways exchange data packets with the mobile device, i.e., maintain a data connection with the mobile device, it is a further advantage that the steps performed by the mobile device can be performed inside a user application, i.e., no modifications to the networking stack of the mobile device are needed and, thus, no administrator privileges or rooting of the device is needed.

Because the mobile device is connected to both networks as a client device, it is an advantage that both wireless interfaces of the mobile device can still be used by other applications running on the device and thus for other data connections.

When the client has a local network address, the method may further comprise, by the first gateway, applying network address translation, NAT, on the header information of the first data packet.

The steps of the above method may further also be performed in the opposite direction in a similar way, for example when the second networking node sends packets to the first networking nodes. The steps are then as follows:

By the second gateway, extracting payload data and header information from a first data packet originating from the second networking node and addressed to the first networking node, and sending the extracted payload and header information as payload of a second data packet to the mobile communication device.

By the mobile communication device, receiving the second data packet, retrieving therefrom the extracted payload and header information, and sending the extracted payload and header information as payload of a third data packet to the first gateway.

By the first gateway, receiving the third data packet, retrieving therefrom the first data packet and forwarding the first data packet further to the first networking node.

According to an embodiment, the method further comprises:
by the first gateway, converting the first data packet to a first Multipath TCP packet; and
by the second gateway, converting the first Multipath TCP packet back to the first data packet; and
thereby establishing an intermediate MPTCP subflow between the first and second gateway serving as transparent proxies for the first and second networking nodes.

This way, the first and second gateways serve as intermediate multi-path proxy nodes. The multi-path capabilities of the gateways can therefore be exploited while the first and second networking nodes do not have multi-path capabilities or the possibility to use them.

The method may then further comprise:
establishing a second intermediate MPTCP subflow between the first and second gateway over a separate access network such as for example a wired access network.

As a MPTCP subflow carries optional MPTCP information, this information must also be exchanged between the first and the second gateways. According to an embodiment this exchange is performed by the following steps:
by the first gateway, adding MPTCP information identifying the intermediate MPTCP subflow to the second data packet;
by the mobile communication device, adding the MPTCP information to the third data packet;
by the second gateway, identifying the intermediate MPTCP subflow by the MPTCP information.

The MPTCP flows are thus identified by adding the additional MPTCP information in the second data packet, for example in the beginning of the data field of the second data packet. This way, the first data packet does not need to be modified in order to add the MPTCP information. The MPTCP information may further comprise a MPTCP token.

According to an embodiment, the method further comprises:
by the first gateway, removing redundant header fields from the extracted header information; and
by the second gateway, reconstructing the redundant header fields in the first data packet based on header information of the third data packet.

As both the first and second data packet and both the first and third data packet comprise a header with header information according to a protocol of the same protocol layer, both headers will comprise similar information which is thus redundant. It is thus an advantage that the packet size can be reduced. Moreover, the risk of packet fragmentation is reduced.

The redundant header fields may for example be selected among the group of a source port field, a destination port field, a length field, a checksum field and the MPTCP DSS option.

According to a second aspect, the invention relates to a computer-implemented method for providing a first networking node in a first network access to a second network by a mobile communication device. The mobile communication device is connected as a wireless client to both the first and second network. The method comprises the following steps performed by the mobile communication device:
receiving from a first gateway in the first network a second data packet, wherein payload data of the second data packet comprises payload data and header information from a first data packet originating from the first networking node and addressed to a second networking node in the second network;
retrieving from the second data packet the payload data and header information;
sending the payload and header information as payload of a third data packet to the second gateway.

Advantageously, these steps are performed in a user application running on the mobile communication device.

According to a third aspect, the invention relates to a computer program product comprising computer-executable instructions for performing the steps performed by the first gateway and/or the second gateway and/or the mobile communication device according to the first or second aspect when the program is run on a computer.

According to a fourth aspect, the invention relates to a computer readable storage medium comprising the computer program product according to third aspect.

According to a fifth aspect, the invention relates to a data processing system programmed for carrying out the steps of the method according to the first or second aspect.

DETAILED DESCRIPTION OF EMBODIMENT(S)

Figure 1:
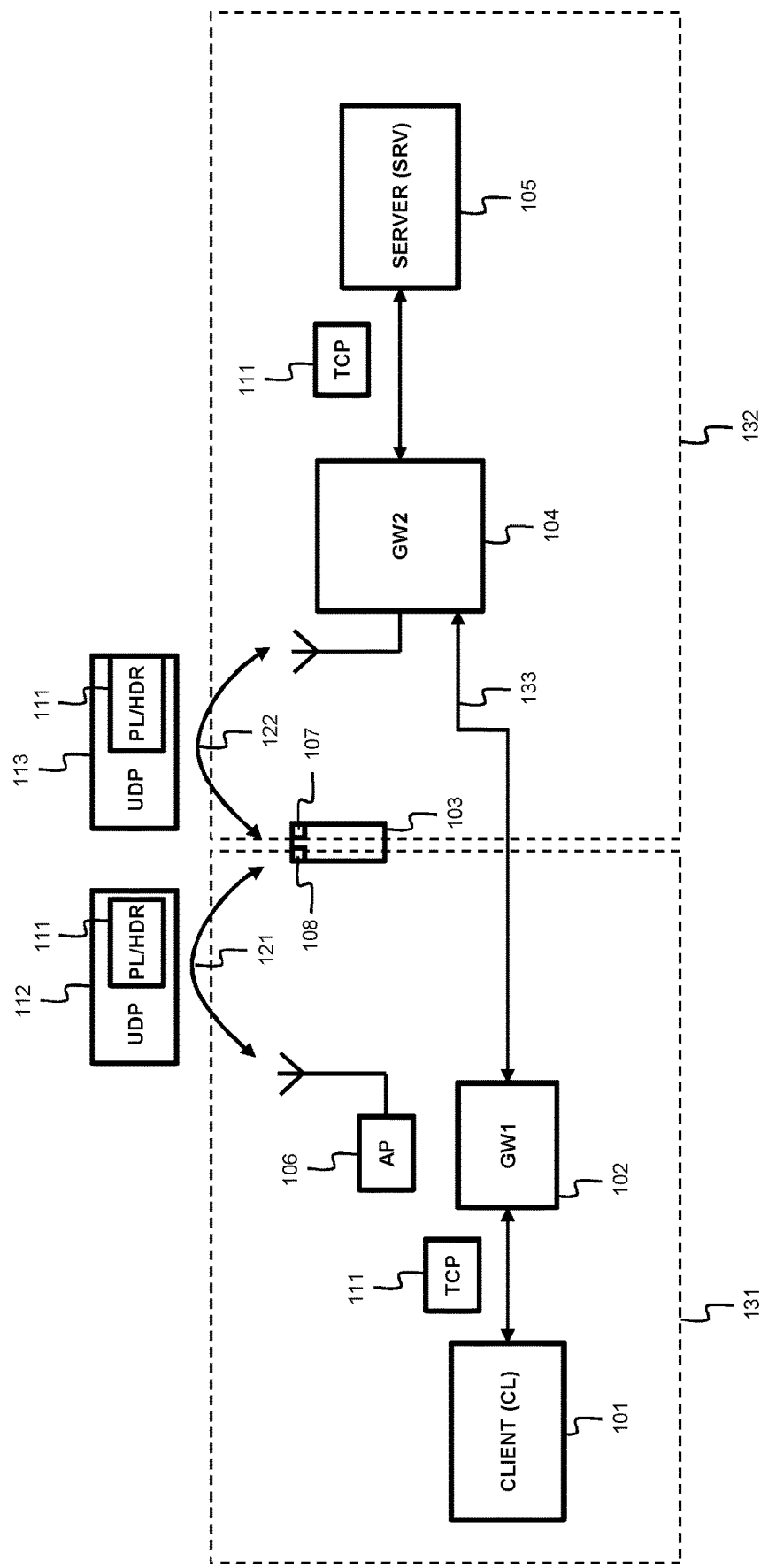
FIG. 1 illustrates a first gateway, mobile device and second gateway for providing a bonding service between a first and a second network according to an embodiment of the invention.

FIG. 1 illustrates a first gateway 102, a second gateway 104 and mobile device 103 according to an embodiment of the invention. First gateway 102 acts as a gateway for networking devices 101 and 106 within the first local network 131. Local network 131 may for example correspond to an IPv4 or IPv6 based Local Area Network or LAN than can be used to setup a home or enterprise network. Data packets origination from within local network 131 but destined outside local network 131 will be forwarded to gateway 102 for further forwarding outside local network 131. For the addressing, the TCP or UDP port numbering scheme may be used combined with the Internet Protocol, IP, addressing scheme which is commonly referred to as TCP/IP.

Gateway 102 may relay packets over an access network to gateway 104 as indicated by the arrow 133. The access network may comprise a wired link such as a cable, fibre or twisted pair network link. In order to use the wired link, gateway 102 may further be connected to a modem or have modem functionality integrated.

Network 131 also comprises a wireless access point 106 such as for example an IEEE 802.11 compatible access point. Wireless access point 106 may further be integrated in gateway 102 or be provided separately.

FIG. 1 further illustrates a second network 132 such as for example the Internet. Mobile communication device 103 can access the second network 132 through gateway 104 as a wireless client device by using wireless link 122. For this purpose, mobile device 103 comprises a wireless interface 107. Wireless link 122 may for example be established over a wireless cellular network providing data access to network 132. Data access may further be provided by UMTS, HSDPA, LTE etc.

Mobile device 103 further comprises a second wireless interface 108 by which it can connect to the access point 106 as a wireless client. This way, mobile device 103 is also part of network 131. Gateway 102, mobile device 103 and gateway 104 are further configured such that mobile device 103 can be used to relay data packets between the first network 131 and the second network 132 while the mobile device 103 is connected as a client to both the access point 106, and thus network 131, and to network 132.

Figure 2:
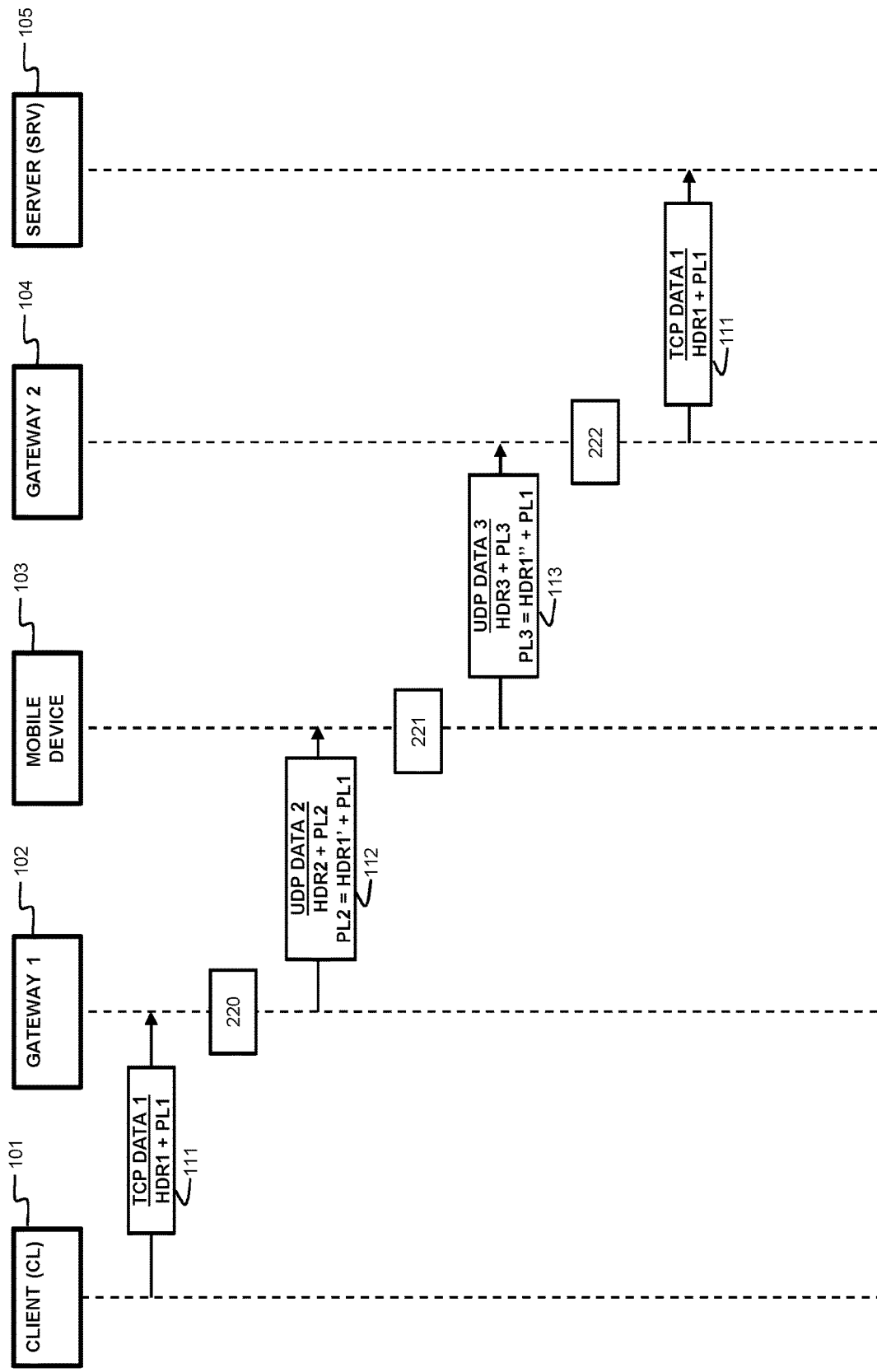
FIG. 2 illustrates packets exchanged and steps performed by the gateways and mobile device shown in FIG. 1 for sending a packet from a client to a server device according to an embodiment of the invention.

FIG. 2 illustrates steps performed by the gateway 131, mobile device 103 and gateway 104 when client device 101 sends a TCP/IP packet 111 to server 105, i.e., wherein the destination address of the packet 111 is the address of server 105.

As the gateway 102 is configured as gateway for network 131, packet 111 will be routed within network 131 to gateway 102. Then, in step 220, the gateway 102 constructs a UDP data packet 112 with the gateway 102 as source and the mobile device 103 as destination. The received data packet 111 is embedded as payload data in the UDP data packet. Then, the gateway sends the data packet 112 to the mobile device 103. As the mobile device 103 is part of the first network 131 by its wireless interface 108, the UDP packet 112 will be routed to the access point 106 and transmitted to the mobile device 103. Optionally, gateway 102 may also perform network address translation, NAT, on packet 111. In this case, the source port and address of the packet 111 are changed by gateway 102. This can be done when client 101 only has a private IP address.

At the mobile device, an application performs step 221 in order to handle the UDP packet 112 received from the gateway 102. The application may for example be a program installed by the user on the mobile device 103. Such applications are sometimes referred to as 'apps' on mobile operating systems such as Android, iOS or Microsoft Windows. In step 221, mobile device 103 receives UDP packet 112. To this extent, the application may be configured to receive and handle packets received on a certain port number or port number range. Furthermore, the header information and payload of packet 111 are extracted from packet 112 and a new UDP packet 113 is constructed with gateway 104 as destination, with the other wireless interface 107 of the mobile device as source and with the extracted payload and header information as payload. Then, the UDP packet 113 is sent to gateway 104.

At gateway 104, UDP packet 113 from mobile device 103 is received. In step 222, gateway 104 extracts the header information and payload data from original packet 111, reconstructs the original packet and sends the reconstructed packet 111 to server 105.

Figure 3:
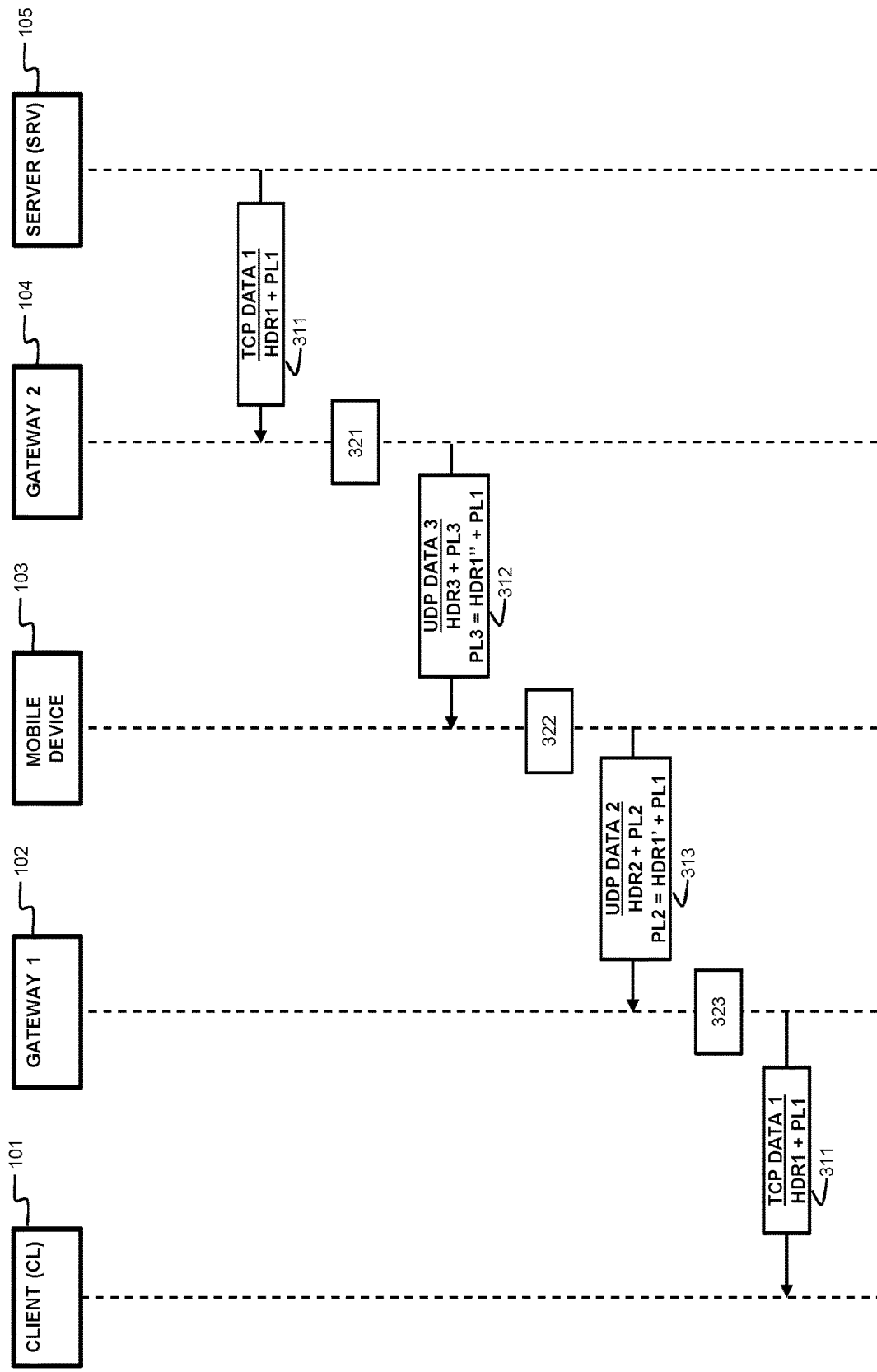
FIG. 3 illustrates packets exchanged and steps performed by the gateways and mobile device shown in FIG. 1 for sending a packet from a server to a client device according to an embodiment of the invention.

FIG. 3 shows the opposite case where a TCP packet 311 originating from server 105 is routed to client 101. TCP packet 311 may for example be a packet that is part of an ongoing TCP connection between client 101 and server 105. As gateway 102 serves as gateway to network 131, packet 311 will be routed to gateway 104. Then, in step 321, gateway 104 establishes that packet 311 is destined to client 101 and, therefore, that the packet 311 must be routed to gateway 102. In order to do so, gateway 104 extracts the payload data and header information from packet 311 and adds it as payload data in a new UDP packet 312 comprising the gateway 104 as source address and the mobile device 103 as destination address. Thereupon, the new UDP packet 312 is sent to mobile device 103.

In step 322, the mobile device receives packet 312, extracts therefrom header information and payload data from the original TCP packet 311, constructs a new UDP packet 313 with as the payload the extracted header information and payload data, with as source address the mobile device 103 and with as destination address gateway 102. Thereupon, the new UDP packet 313 is sent to gateway 102.

In step 323, the gateway 102 receives packet 313, extracts therefrom the header information and the payload data from the original TCP packet 311, reconstructs the original TCP packet 311 and forwards it to client 101. Optionally, when network address translation is applied by gateway 102, then gateway 102 will identify the ongoing TCP connection and change the destination address from that of gateway 102 to the local network address of the client 101. Similarly, the destination port number of the gateway will be changed to the port number of the client 101 used for the ongoing connection.

By the above steps, a bonding service is established between the first network 131 and second network 132, i.e., a device in network 131 is provided network access to network 132 by using the wireless links 121 and 122.

In order to configure the smartphone 103, gateway 102 and gateway 104 to perform the steps according to the above embodiments, a discovery mechanism that initializes the smartphone's application, the gateway 102 and gateway 104 may be used. During the discovery procedure, control messages may be exchanged between the gateway 102, the mobile device 103 and the gateway 104. The discovery procedure may be initiated by the gateway 102 or the mobile device 103 or the gateway 104. Possible ways to exchange the control information and thus to perform the discovery procedure are:

- The transmission of multicast messages indicating the capabilities of the gateway 102, the gateway 104 and the mobile device 103.
- The transmission of messages according to multicast DNS or mDNS, a zero-configuration protocol published as RFC 6762 using multicast UDP packets. mDNS may further work in conjunction with the DNS Service Discovery (DNS-SD) protocol published as RFC 6763. Specific implementations are for example provided by the Apple Bonjour and Linux nss-mdns services.
- The exchange of messages over a specific predefined port, for example by running a specific service on any of the devices 102, 103 and 104 listening on this predefined port.

During such a discovery procedure, several steps may be performed to configure devices 102, 103 and 104:

- Identify the mobile device 103 that provides the bonding service.
- Verify the credentials of the devices 102, 103, 104 depending on which device is configured to authenticate the network bonding service. This authentication process may also be administered by a separate service running on another device, for example on a server within a provider's network or as a cloud service.
- Negotiate various parameters of the bonding protocol, e.g. IP address of the gateway 104, a versioning number of the bonding service . . . .

Figure 4:
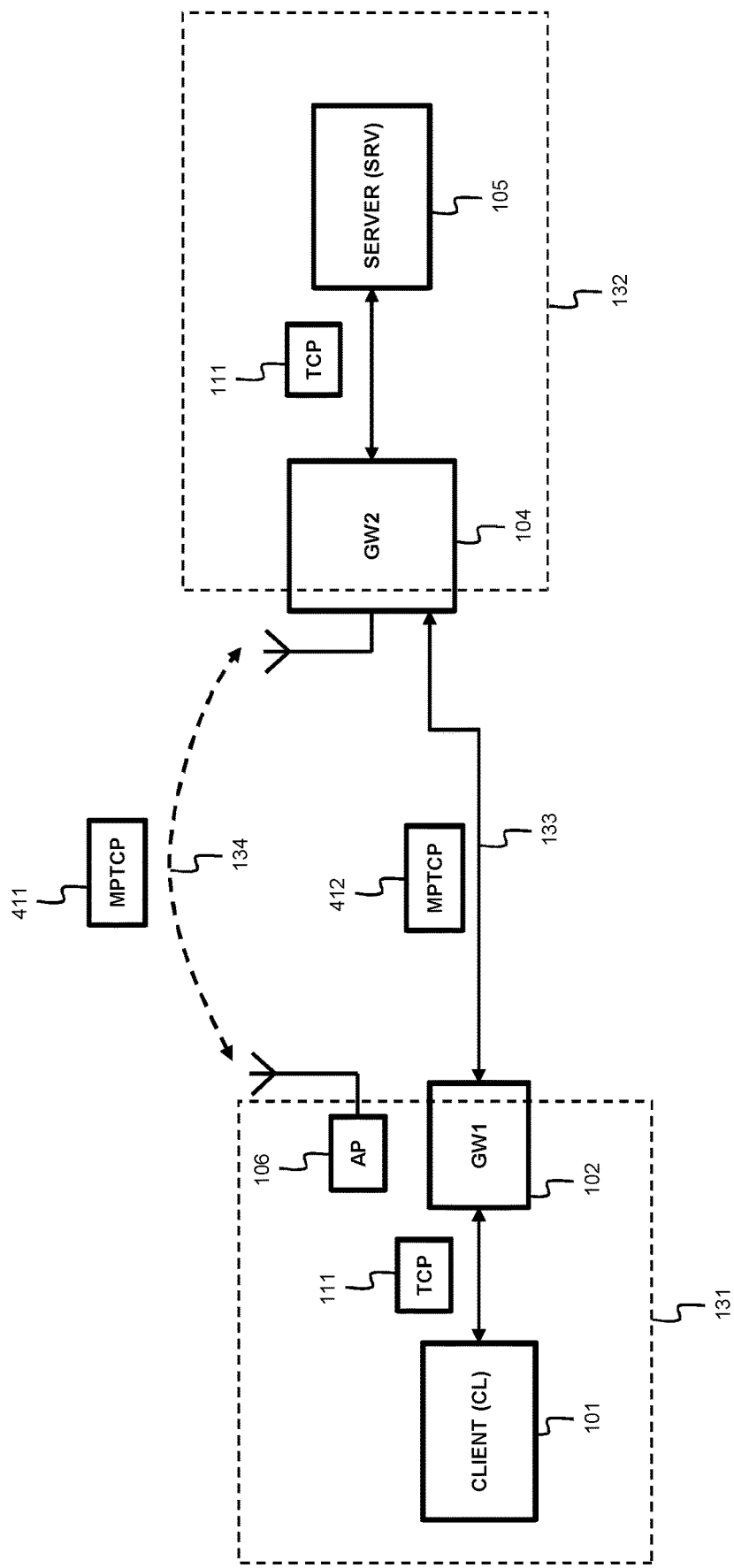
FIG. 4 illustrates a first gateway, mobile device and second gateway for providing a bonding service between a first and a second network and an intermediate MPTCP subflow according to an embodiment of the invention.

Through the bonding service established between gateway 102, mobile device 103 and gateway 104, a virtual link is established between gateway 102 and gateway 104. FIG. 4 illustrates this situation where the virtual link 134 is shown by the dashed line 134. Through virtual link 134, a TCP connection may be established between client 101 and server 105 wherein it appears as the TCP packets 111 travels between gateway 102 and gateway 104.

As already illustrated by FIG. 1 and FIG. 4, gateway 102 may comprise another networking interface over which a second link 133 is established with the gateway 104, for example over a second access network. The second link 133 may for example comprise a wired link. This situation typically occurs in an access provider's network where the gateway 102 corresponds to a customer premises equipment or CPE providing a subscriber of the access provider network access to network 132, typically the Internet. When another wired or wireless interface that can provide network access to network 132 is provided within the CPE 102, then the CPE is typically referred to as a hybrid customer premises equipment or HCPE. A typical HCPE comprises for example a wired network interface for providing the link 133 and a wireless cellular interface for providing a wireless data connection with gateway 104. This way, using multipath capabilities, the bandwidth available to the end user may be increased by utilizing both wired and wireless links of the HCPE.

Through the bonding service as described above resulting in the virtual network link 134, a similar functionality may be provided to CPEs which do not comprise such a second wireless cellular interface that can connect to the gateway 104. By the bonding service it is possible to provide multipath capabilities to an end user when there is a wireless access point 106 and a mobile device 130 available. This way, one subflow flow can be established over the network link 133 and another subflow flow can be established by the virtual network link 134, i.e., over the combination of wireless link 121, the mobile device 103 and wireless link 122.

The following embodiment shows how multipath capabilities may be provided between gateways 102 and 104, while both the client 101 and server 105 perceive the overall TCP network connection as a single path connection. According to the embodiment, the client 101 establishes a TCP connection with the server 105, i.e., a connection wherein both the client 100 and the server 103 maintain TCP state information in order to maintain a reliable connection. When sending data over the TCP connection to the server 105, the client 101 sends the TCP segments 111 to the gateway 102. The gateway 102 maintains both a TCP state and a Multipath TCP, MPTCP, connection state. MPTCP as referred herein, refers to the MPTCP protocol which is an extension of the TCP protocol. A version of the protocol is published by the IETF in RFC 6824. The gateway 102 then converts the TCP segments 111 to MPTCP segments 411 or 412 and may send them over respectively the network link 134 or 133. The gateway 102 then maintains a primary MPTCP subflow over the first link 134 with the gateway 104 and an auxiliary MPTCP subflow 124 over the second link 133 with the gateway 104. Alternatively, the primary MPTCP subflow may run over the link 133 and the auxiliary MPTCP subflow may run over the link 134. This way, the TCP connection between client 131 and server 132 may benefit from the aggregated bandwidth of the two links 133 and 134. Also the gateway 104 will maintain both a TCP and a MPTCP connection state. When the gateway 104 receives the MPTCP segments from the gateway 102, it converts the MPTCP segments 411 or 412 back to the TCP segments 111 and forwards them to the server 105. TCP segments originating from the server may be sent in a similar way to the client 101.

Figure 5:
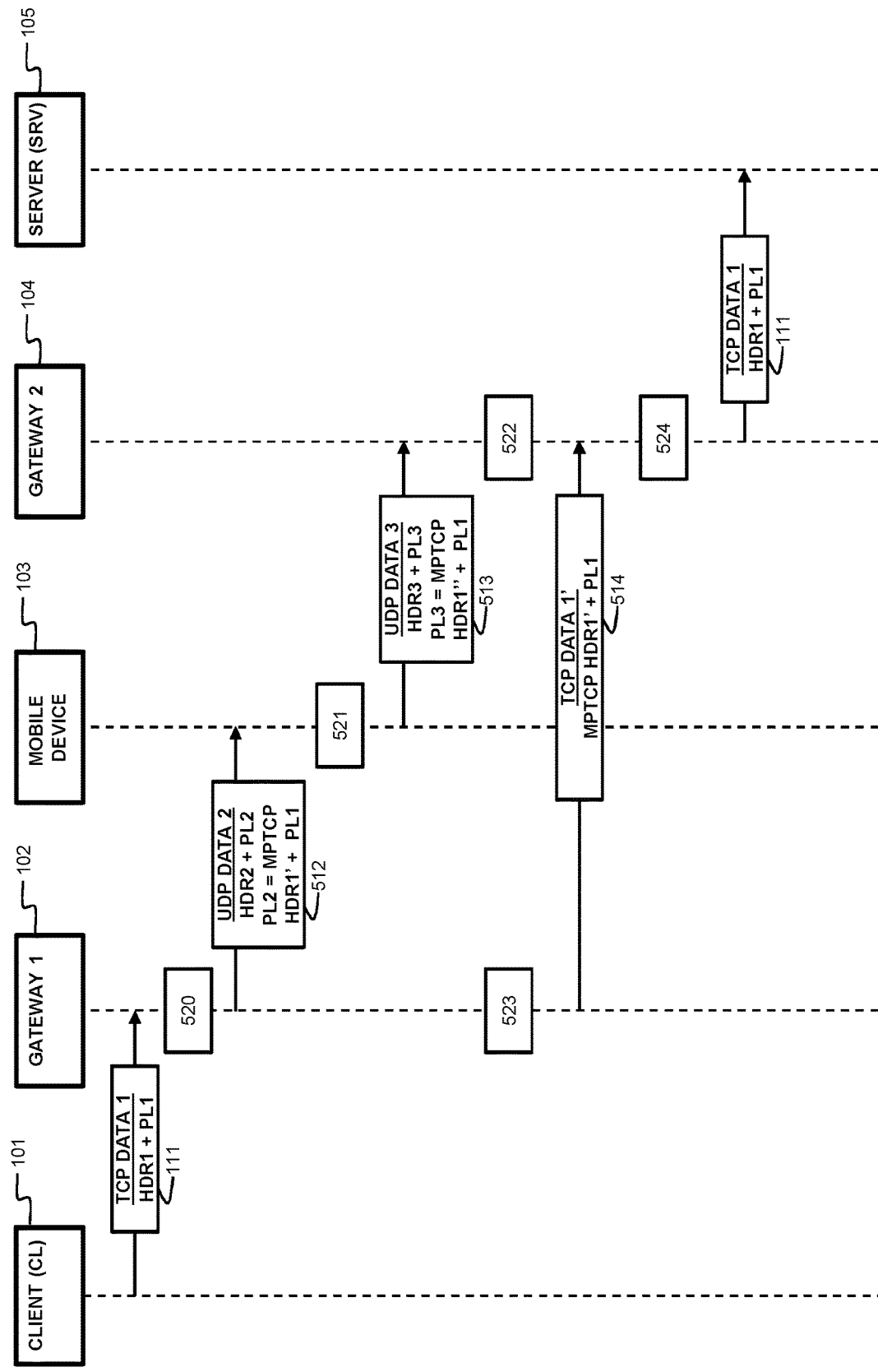
FIG. 5 illustrates packets exchanged and steps performed by the gateways and mobile device shown in FIG. 1 for sending a packet from a client to a server device over an intermediate MPTCP subflow according to an embodiment of the invention.

FIG. 5 illustrates steps performed by the different devices according to an embodiment. The case of FIG. 5 reflects the situation as depicted in FIG. 4, i.e., when the two networking paths 133 and 134 are available between the gateways 102 and 104 and Multipath TCP is used to aggregate the bandwidth offered by the combination of these two paths. FIG. 5 further illustrates the case where the TCP connection between client 101 and server 105 has already been established, in other words, the MPTCP connection state between gateways 102 and 104 has already been established. First, gateway 102 receives TCP segment 111 addressed to server 105 similar to the case from FIG. 2. As the gateway 102 maintains a MPTCP connection state with gateway 104, it first decides whether to transmit the TCP packet over the first subflow, i.e., networking path 133, or over the second subflow, i.e., networking path 134.

In a first scenario, gateway 102 decides to transmit the packet over the second link 134, with is the auxiliary MPTCP subflow. Therefore, in step 520, it extracts header information and payload data from TCP packet 111 and embeds it as payload data in UDP packet 512. The UDP packet is addressed to the mobile device 103 and has as source address gateway 102. As the packet 111 becomes part of a MPTCP subflow, the gateway also adds in step 520 MPTCP information such as the MPTCP token identifying the subflow according to the MPTCP protocol to the UDP packet. During this conversion step 520, the original destination address information of the TCP header may be preserved. Alternatively, the destination address information may be changed to the address information of the second gateway 104. In that case, the second gateway can recover the original destination address information by relating the MPTCP packet to the MPTCP state and thus to the ongoing TCP connection by the MPTCP information. In another alternative, the destination address information may be completely omitted from the TCP header and again be recovered at the second gateway 104. When NAT is applied, the source address information of the client 101 may be changed to that of the first gateway 102. Furthermore, this source address information may again be omitted or left in the MPTCP header. By the conversion step 520, the TCP segment 111 is thus converted into a MPTCP segment embedded as payload in the UDP packet 512.

Then, the UDP packet 512 is sent to the mobile device 103. At the mobile device, in step 521, the UDP packet is received, converted to a new UDP packet 513 with the MPTCP header information and the original payload of the TCP data packet 111. Finally, the new UDP packet 513 is sent to the gateway 104.

At the gateway 104, during step 522 the UDP packet 513 is received, the header information and payload data of the original packet 111 is extracted and the original data packet 111 is restored. As outlined above, the MPTCP information may be used to identify the subflow and restore the original TCP packet 111. Subsequently, the original packet 111 is forwarded to the server 105. During the conversion step 522, source and destination address information of the TCP header is restored as outlined above. Finally, TCP packet 111 will arrive at the server 103 as a single path TCP segment originating from the client 101.

In the second scenario the gateway 102 decides to forward the TCP packet 111 along the other subflow, i.e., along networking path 133 which is the primary MPTCP subflow. Therefore, in step 523, the gateway 102 converts the TCP segment 111 in step 523 in a MPTCP segment 514. When the packets sent by the first gateway along path 133 are always routed to the second gateway 104, then the destination address information of the TCP header does not need to be changed. Second gateway 104 will then identify the segment 514 as part of the ongoing MPTCP connection based on the destination address information. Alternatively, for example when the packets are not automatically routed along second gateway 104, the destination address information of the TCP header may be replaced by the address information of the second gateway 104. Further MPTCP information, such as an MPTCP token, is then added to the MPTCP header. When the packet is then received at the gateway 104, the MPTCP connection is identified from the MPTCP information such that the original packet 111 can be restored. When NAT is applied, the source address information is changed to that of the first gateway 102, otherwise the source address information is preserved.

Subsequently, at step 524, the MPTCP segment 514 arrives at the gateway 104, is converted back to the original TCP segment 111 and forwarded to the server 105. For the second case, when the subflow is an auxiliary subflow, the gateway identifies the MPTCP segment 514 as part of the MPTCP connection. As the gateway 104 knows that the subflow is part of the TCP connection with server 105, it puts back the address of the server 105 as destination address.

By the steps performed according to the embodiment of FIG. 5, an intermediate Multipath TCP connection is established between the gateways 102 and 104. This connection is transparent to the server as the addressing information of the TCP segment 111 remains unchanged upon arrival of the packet at the server 105.

Similar reverse steps may be performed when a packet is sent from the server 105 to the client 101. For the same reason, the connection will also appear transparent to the client 101 as the addressing information of a segment received at the client will remain the same as if no intermediate MPTCP connection was present between the gateways 102 and 104.

The above steps are applicable to an established MPTCP connection between the gateways 102 and 104, i.e., for the exchange of data packets and acknowledgements. However, when the connection is setup by the exchange of synchronization or SYN segments, the TCP header information must be preserved and the MPTCP information provided.

According to an embodiment, UDP segment 112 is constructed by incorporating the complete header information and payload data of TCP segment 111 in the payload data field of the UDP segment. A similar procedure may be followed in steps 221, 321, 322 and 520.

Figure 6:
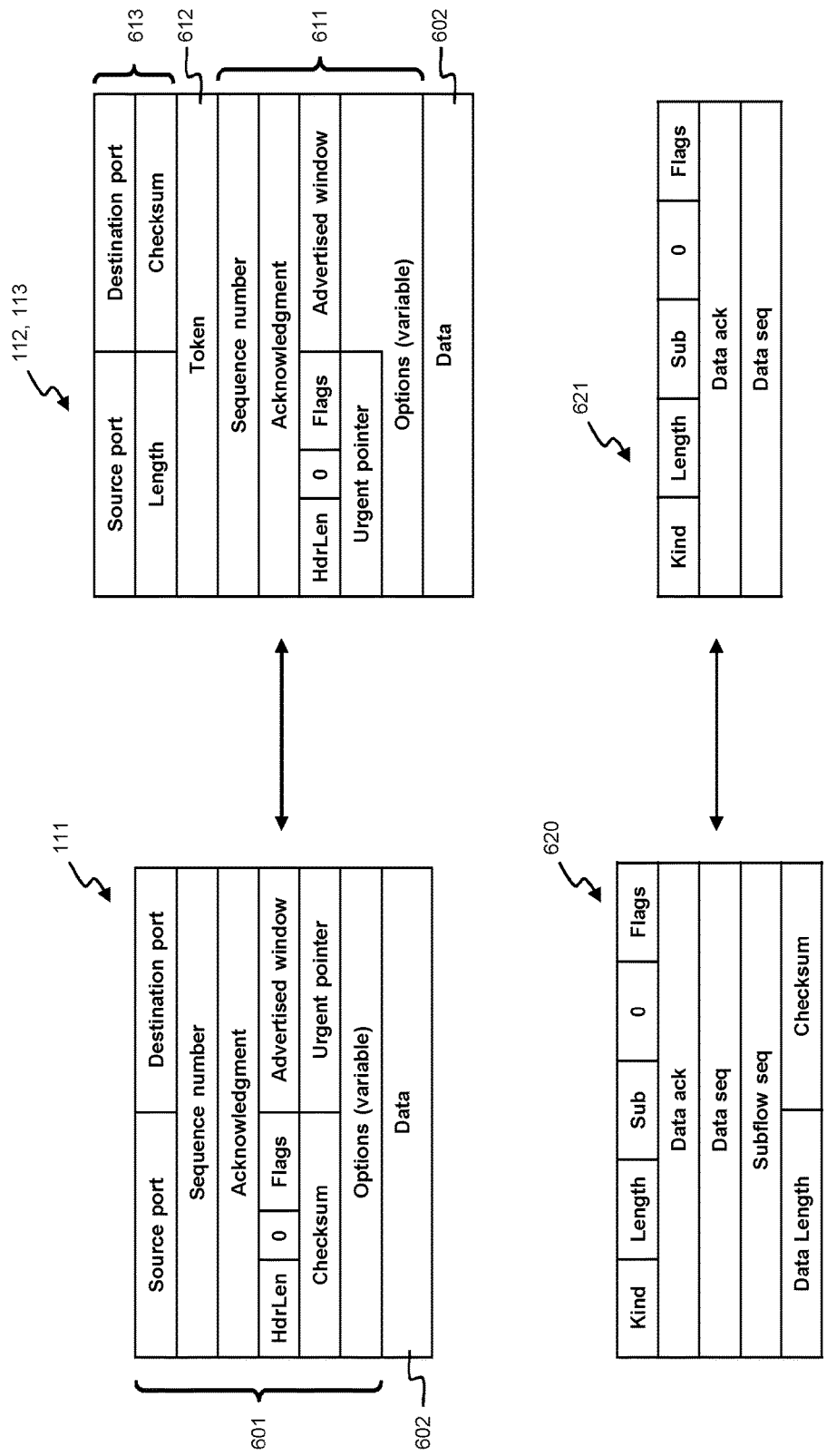
FIG. 6 illustrates a TCP packet and a UDP packet with the TCP packet compressed as payload of the UDP packet; and illustrates a DSS TCP field and a compressed version of the DSS TCP field.

According to an alternative embodiment, the header information of TCP segment 111 is further compressed in UDP segment 112 in order to minimize the size of the UDP segment and to minimize the chance of fragmentation of the UDP segment. FIG. 6 illustrates how such compression may be achieved.

FIG. 6 shows a TCP header 601 and payload data field 602 of TCP segment 111 as received by gateway 102. This TCP segment is then converted to UDP segment 112 in the following way:

The source port, destination port and checksum are removed from the TCP header resulting in a compressed TCP header 611. When the TCP segment is a SYN segment, then the port information must be preserved.

The compressed TCP header 611 and original payload data 602 become the payload data of the UDP segment 112.

If MPTCP is applied between the gateways 102 and 104, the token 612 identifying the MPTCP subflow is added at the beginning of the UDP payload data.

A similar compression may be applied during conversion steps 220, 321, 520 thereby obtaining UDP segments 112, 312 and 512 respectively. By this compression only 6 bytes are added to each packet. Optionally, to keep data aligned on 4 bytes boundaries, the checksum field may be kept in the compressed TCP header.

Additionally, in the case of MPTCP, the MPTCP DSS option 620 may also be further compressed to a compressed MPTCP DSS option 621. By this compression, the subflow sequence number, data Length field and Checksum field are removed from the DSS option 621.

Then, during the reconstruction of the original TCP packet 111, the opposite steps are performed by inferring the TCP and MPTCP segment values from the UDP header, token and payload data. For example, the Checksum field from the both the TCP header and the DSS option are reconstructed from the UDP Checksum.

Figure 7:
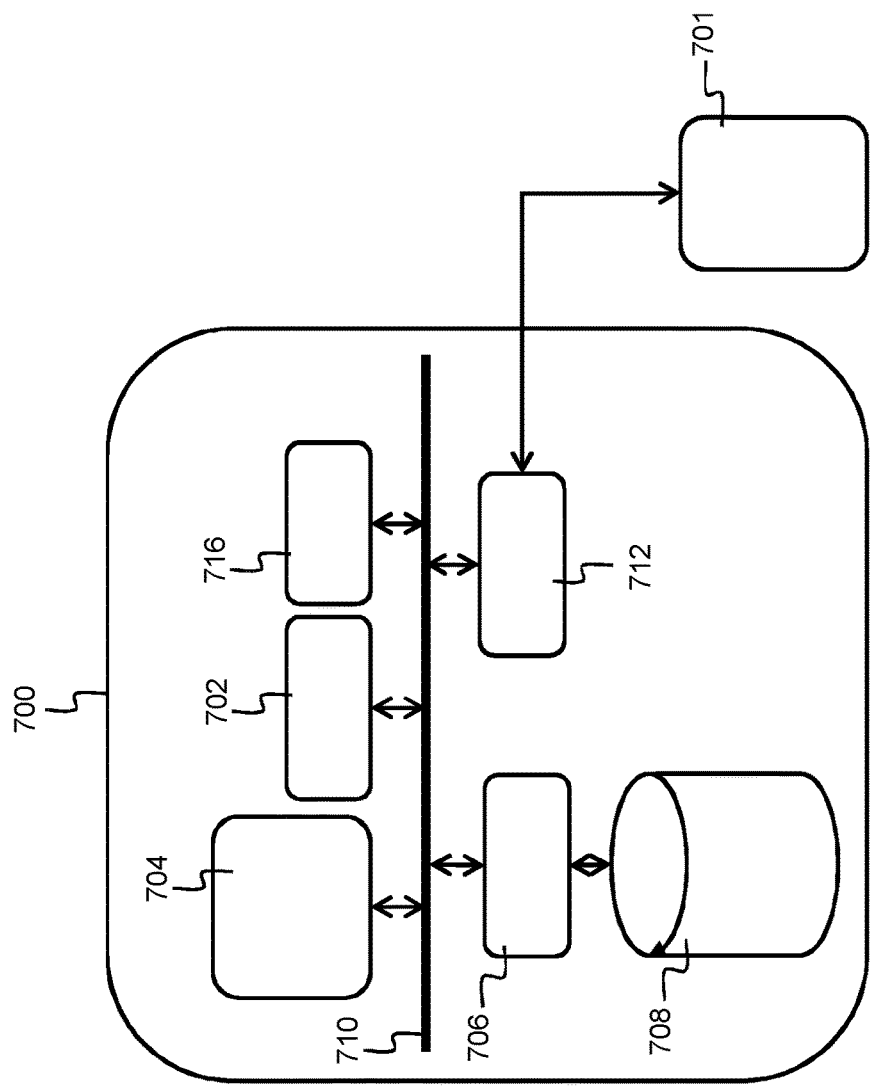
FIG. 7 illustrates a suitable computing for use as a gateway or mobile device according to an embodiment of the invention.

FIG. 7 shows a suitable computing system 700 as a further embodiment of the gateways 102, 104 and mobile device 103. Computing system 700 may in general be formed as a suitable general purpose computer and comprise a bus 710, a processor 702, a local memory 704, one or more optional output interfaces 716, a communication interface 712, a storage element interface 706 and one or more storage elements 708. Bus 710 may comprise one or more conductors that permit communication among the components of the computing system 700. Processor 702 may include any type of conventional processor or microprocessor that interprets and executes programming instructions. Local memory 704 may include a random access memory (RAM) or another type of dynamic storage device that stores information and instructions for execution by processor 702 and/or a read only memory (ROM) or another type of static storage device that stores static information and instructions for use by processor 702. Storage element interface 706 may comprise a storage interface such as for example a Serial Advanced Technology Attachment (SATA) interface or a Small Computer System Interface (SCSI) for connecting bus 710 to one or more storage elements 708, such as one or more local disks, for example SATA disk drives, and control the reading and writing of data to and/or from these storage elements 708. Although the storage elements 708 above is described as a local disk, in general any other suitable computer-readable media such as a solid state drive or flash memory cards could be used. The system 700 described above can also run as a Virtual Machine above the physical hardware. The steps performed on the gateways 102, 104 or mobile device 103 according to the above embodiments may be partly or completely implemented as programming instructions to be run on processor 702. Communication interface 712 may further correspond to the gateways 102, 104 or mobile device's networking interface.

Although the present invention has been illustrated by reference to specific embodiments, it will be apparent to those skilled in the art that the invention is not limited to the details of the foregoing illustrative embodiments, and that the present invention may be embodied with various changes and modifications without departing from the scope thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein. In other words, it is contemplated to cover any and all modifications, variations or equivalents that fall within the scope of the basic underlying principles and whose essential attributes are claimed in this patent application. It will furthermore be understood by the reader of this patent application that the words "comprising" or "comprise" do not exclude other elements or steps, that the words "a" or "an" do not exclude a plurality, and that a single element, such as a computer system, a processor, or another integrated unit may fulfil the functions of several means recited in the claims. Any reference signs in the claims shall not be construed as limiting the respective claims concerned. The terms "first", "second", third", "a", "b", "c", and the like, when used in the description or in the claims are introduced to distinguish between similar elements or steps and are not necessarily describing a sequential or chronological order. Similarly, the terms "top", "bottom", "over", "under", and the like are introduced for descriptive purposes and not necessarily to denote relative positions. It is to be understood that the terms so used are interchangeable under appropriate circumstances and embodiments of the invention are capable of operating according to the present invention in other sequences, or in orientations different from the one(s) described or illustrated above.

The invention claimed is:

1. A computer-implemented method for providing a first networking node in a first network access to a second network by a mobile communication device;
   wherein the mobile communication device is connected as a wireless client to both the first and second network; and wherein the method comprises the following steps:
   by a first gateway in the first network, extracting payload data and header information from a first data packet originating from a first networking node and addressed to a second networking node in the second network, and sending the extracted payload data and header information as a payload of a second data packet to the mobile communication device; and
   by the mobile communication device, receiving the second data packet, retrieving therefrom the extracted payload data and header information, and sending the extracted payload data and header information as a payload of a third data packet to a second gateway;
   by the second gateway, receiving the third data packet, retrieving therefrom the first data packet and forwarding the first data packet further to a second networking node; by the first gateway, converting the first data packet to a first Multipath Transmission Control Protocol (Multipath TCP) packet, and wherein the first data packet uses a connection-oriented transport protocol;
   by the second gateway, converting the first Multipath TCP packet back to the first data packet; and
   thereby establishing a first intermediate Multipath TCP subflow between the first and second gateways serving as transparent proxy servers for the first and second networking nodes;
   establishing a second intermediate Multipath TCP subflow between the first and second gateways over a separate access network.

2. The method according to claim 1 wherein the second or third data packet or both use a connectionless transport protocol.

3. The method according to claim 1 further comprising, by the first gateway, applying network address translation, (NAT) on the header information of the first data packet.

4. The method according to claim 1 further comprising:
by the first gateway, adding Multipath TCP information identifying the first intermediate Multipath TCP subflow to the second data packet;
by the mobile communication device, adding the Multipath TCP information to the third data packet;
by the second gateway, identifying the first intermediate Multipath TCP subflow by the Multipath TCP information.

5. The method according to claim 4 wherein the Multipath TCP information comprises a Multipath TCP token.

6. The method according to claim 1 further comprising:
by the first gateway, removing one or more redundant header fields from the extracted header information; and
by the second gateway, reconstructing the one or more redundant header fields in the first data packet based on the header information of the third data packet.

7. The method according to claim 5 wherein one or more redundant header fields are one or more from the group of a source port field, a destination port field, a length field, a checksum field and a Multipath TCP Data Sequence Signal (DSS) option.

8. A computer-implemented method for providing a first networking node in a first network access to a second network by a mobile communication device;
wherein the mobile communication device is connected as a wireless client to both the first and second networks;
wherein a first gateway converts a first data packet to a first Multipath Transmission Control Protocol (Multipath TCP) packet, and wherein the first data packet uses a connection-oriented transport protocol;
wherein a second gateway converts the first Multipath TCP packet back to the first data packet; thereby establishing a first intermediate Multipath TCP subflow between the first and second gateways serving as transparent proxy servers for first and second networking nodes;
wherein a second intermediate Multipath TCP subflow is established between the first and second gateways over a separate access network; and
wherein the method comprises the following steps performed by the mobile communication device:
receiving from the first gateway in the first network a second data packet,
wherein payload data of the second data packet comprises payload data and header information from a first data packet originating from the first networking node and addressed to the second networking node in the second network;
retrieving from the second data packet the payload data and header information;
sending the payload data and header information as a payload of a third data packet to the second gateway.

9. The method according to claim 8 wherein the steps are performed in a user application running on the mobile communication device.

10. A computer program product comprising computer-executable instructions run on a computer for executing the steps:
by a first gateway in a first network, extracting payload data and header information from a first data packet originating from a first networking node and addressed to a second networking node in a second network, and
sending the extracted payload data and header information as a payload of a second data packet to a mobile communication device; and
by the mobile communication device, receiving the second data packet, retrieving therefrom the extracted payload data and header information, and
sending the extracted payload data and header information as a payload of a third data packet to a second gateway;
by the second gateway, receiving the third data packet, retrieving therefrom the first data packet and forwarding the first data packet further to the second networking node;
by the first gateway, converting the first data packet to a first Multipath Transmission Control Protocol (Multipath TCP) packet; and
by the second gateway, converting the first Multipath TCP packet back to the first data packet; and
thereby establishing a first intermediate Multipath TCP subflow between the first and second gateways serving as transparent proxy servers for the first and second networking nodes;
establishing a second intermediate Multipath TCP subflow between the first and second gateways over a separate access network.

11. A method of using a computer readable storage medium comprising the computer program product according to claim 10.

12. A data processing system comprising a memory and a processor, the processor configured to:
by a first gateway in a first network, extract payload data and header information from a first data packet originating from a first networking node and addressed to a second networking node in a second network, and
send the extracted payload data and header information as a payload of a second data packet to a mobile communication device; and
by the mobile communication device, receiving a second data packet, retrieving therefrom the extracted payload data and header information, and
send the extracted payload data and header information as a payload of a third data packet to a second gateway;
by the second gateway, receive the third data packet, retrieving therefrom the first data packet and forwarding the first data packet further to the second networking node;
by the first gateway, converting the first data packet to a first Multipath Transmission Control Protocol (Multipath TCP) packet; and
by the second gateway, converting the first Multipath TCP packet back to the first data packet; and
thereby establishing a first intermediate Multipath TCP subflow between the first and second gateways serving as transparent proxy servers for the first and second networking nodes;
establishing a second intermediate Multipath TCP subflow between the first and second gateways over a separate access network.

* * * * *